United States Patent
Wang et al.

(10) Patent No.: US 11,510,089 B2
(45) Date of Patent: Nov. 22, 2022

(54) MEASUREMENT CONFIGURATION AND REPORT FOR SIDELINK OPEN-LOOP POWER CONTROL

(71) Applicant: MediaTek Singapore Pte. Ltd., Singapore (SG)

(72) Inventors: Xuelong Wang, Beijing (CN); Tao Chen, Beijing (CN); Nathan Edward Tenny, San Jose, CA (US); Ming-Yuan Cheng, Hsin-Chu (TW); Guan-Yu Lin, Hsin-Chu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 36 days.

(21) Appl. No.: 17/125,351

(22) Filed: Dec. 17, 2020

(65) Prior Publication Data

US 2021/0195454 A1    Jun. 24, 2021

Related U.S. Application Data

(63) Continuation of application No. PCT/CN2019/126163, filed on Dec. 18, 2019.

(30) Foreign Application Priority Data

Dec. 15, 2020 (CN) .................... CN202011475568.0

(51) Int. Cl.
*H04W 24/10* (2009.01)
*H04W 76/10* (2018.01)
(Continued)

(52) U.S. Cl.
CPC .......... *H04W 24/10* (2013.01); *H04L 5/0048* (2013.01); *H04W 52/10* (2013.01);
(Continued)

(58) Field of Classification Search
CPC . H04W 24/10; H04W 52/10; H04W 72/0473; H04W 76/10; H04W 92/18;
(Continued)

(56) References Cited

U.S. PATENT DOCUMENTS

2020/0344722 A1\* 10/2020 He .................... H04W 72/02
2021/0250798 A1\* 8/2021 Jeong .................. H04W 76/27

OTHER PUBLICATIONS

• Z. Ali, S. Lagen, L. Giupponi and R. Rouil, "3GPP NR V2X Mode 2: Overview, Models and System-Level Evaluation," in IEEE Access, vol. 9, pp. 89554-89579, 2021, doi: 10.1109/ACCESS.2021. 3090855 (Year: 2021).\*

(Continued)

*Primary Examiner* — Nader Bolourchi
(74) *Attorney, Agent, or Firm* — Helen Mao; Zheng Jin; Imperium Patent works

(57) ABSTRACT

Apparatus and methods are provided for sidelink measurement configuration and report for open-loop sidelink power control. In one embodiment, the SL measurement report configuration configures a first measurement report, and wherein the reference threshold is an absolute reference threshold. In another embodiment, the reference threshold is an SL measurement result in an SL measurement report previously sent to the transmitting UE. In some embodiments, the reporting condition is the layer-3 (L3) filtered SL RSRP measurement being the offset higher or lower than the reference threshold. In yet another embodiment, the reporting condition is an explicit request of measurement report from the transmitting UE. In one embodiment, the SL measurement report includes one or more elements comprising a Boolean indicator, a delta value between the L3 filtered SL RSRP measurement and the reference threshold, and an absolute value of the L3 filtered SL RSRP measurement.

20 Claims, 6 Drawing Sheets

(51) Int. Cl.
*H04W 52/10* (2009.01)
*H04W 72/04* (2009.01)
*H04L 5/00* (2006.01)
*H04W 92/18* (2009.01)

(52) U.S. Cl.
CPC ....... *H04W 72/0473* (2013.01); *H04W 76/10* (2018.02); *H04W 92/18* (2013.01)

(58) Field of Classification Search
CPC ... H04W 52/383; H04W 76/14; H04W 24/08; H04L 5/0048; H04B 17/327
See application file for complete search history.

(56) References Cited

OTHER PUBLICATIONS

• M. H. C. Garcia, A. Molina-Galan, M. Boban, J. Gozalvez, B. Coll-Perales, T. Sahin, and A. Kousaridas, "A tutorial on 5G NR V2X communications," IEEE Commun. Surveys Tuts., early access, Feb. 3, 2021, doi: 10.1109/COMST.2021.3057017 (Year: 2021).*
• Device to Device Communication in LTE. Application Note 1MA264. Rohde & Schwarz. 2015. online <https://www.rohde-schwarz.com/ua/applications/device-to-device-communication-in-lte-white-paper_230854-142855.html> (Year: 2015).*
• 3GPP TS 36.302: "Evolved Universal Terrestrial Radio Access (E-UTRA); Services provided by the physical layer (Release 15)"; V15.2.0; Mar. 2019 (Year: 2019).*

* cited by examiner

US 11,510,089 B2

MEASUREMENT CONFIGURATION AND REPORT FOR SIDELINK OPEN-LOOP POWER CONTROL

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2019/126163, titled "Methods and Apparatus of Measurement Configuration and Report for Sidelink Open-loop Power Control," with an international filing date of Dec. 18, 2019. This application claims priority under 35 U.S.C. § 119 from Chinese Application Number CN 202011475568.0, titled "MEASUREMENT CONFIGURATION AND REPORT FOR SIDELINK OPEN-LOOP POWER CONTROL," filed on Dec. 15, 2020. The disclosure of each of the foregoing documents is incorporated herein by reference.

TECHNICAL FIELD

The disclosed embodiments relate generally to wireless communication, and, more particularly, to enable measurement configuration and report for sidelink open-loop power control.

BACKGROUND 5G radio access technology will be a key component of the modern access network. It will address high traffic growth and increasing demand for high-bandwidth connectivity. In 3GPP New Radio (NR), sidelink continues evolving. With new functionalities supported, the sidelink offers low latency, high reliability and high throughout for device to device communications. In NR vehicle to everything (V2X) supports open-loop power control. The current open-loop power control is only configured with downlink (DL) pathloss and/or sidelink pathloss. Power control for physical sidelink feedback channel (PSFCH) is also supported and is based on pathloss between the PSFCH transmitting (TX) UE and the gNB if the PSFCH TX UE is in-coverage. The open-loop power control for sidelink requires fast operation and efficiency. The transmitting UE needs more information to perform open-loop power control more efficiently.

Improvements and enhancements are required for measurement configuration and report for sidelink open-loop power control.

SUMMARY

Apparatus and methods are provided for sidelink measurement configuration and report for open-loop sidelink power control. In one novel aspect, sidelink measurements are configured for the receiving UE to trigger the sending of the sidelink measurement report to the transmitting UE for open-loop power control. In one embodiment, the UE establishes the SL connection with a transmitting UE in a wireless network, receives an SL measurement report configuration for an SL measurement report, wherein the SL measurement report configuration comprising a reference threshold, performs an layer-3 (L3) filtered SL measurements on the SL link connection to get an SL measurement result including an L3 filtered SL reference signal received power (RSRP), and sends the SL measurement report based on the SL measurement result to the transmitting UE when a reporting condition is met based on the SL measurement report configuration. In one embodiment, the SL measurement report configuration configures a first measurement report, and wherein the reference threshold is an absolute reference threshold. In another embodiment, the reference threshold is an SL measurement result in an SL measurement report previously sent to the transmitting UE. In one embodiment, the reporting condition is the L3 filtered SL RSRP measurement being higher than the reference threshold. In another embodiment, the reporting condition is the L3 filtered SL RSRP measurement being lower than the reference threshold. In one embodiment, the SL measurement report configuration further comprising an offset. In one embodiment, the reporting condition is the L3 filtered SL RSRP measurement is the offset higher than the reference threshold. In another embodiment, the reporting condition is the L3 filtered SL RSRP measurement is the offset lower than the reference threshold. In yet another embodiment, the reporting condition is an explicit request of measurement report from the transmitting UE. In one embodiment, the SL measurement report includes one or more elements comprising a Boolean indicator, a delta value between the L3 filtered SL RSRP measurement and the reference threshold, and an absolute value of the L3 filtered SL RSRP measurement.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

In an NR wireless network, the sidelinks are enabled. The power control for sidelink is open-loop power control performed at the transmitting UE based on pathloss. When the SL open-loop power control is configured to use both DL pathloss and SL pathloss, the minimum of the power values given by open-loop power control based on DL pathloss and the open-loop power control based on SL pathloss is taken. A receiving UE is able to measure the reference signal received power (RSRP) of the demodulation reference signal (DMRS) on the physical sidelink shared channel (PSSCH), and report the measurement result through higher layer signaling to the transmitting UE, by which the transmitting UE can estimate pathloss of sidelink transmissions. For SL-RSRP measurement/reporting for open-loop power control for PSCCH/PSSCH, the SL-RSRP measurement is subject to L3 filtering. For SL open-loop power control of PSSCH, PSSCH DMRS is used. TX UE provides SL measurement configuration via PC5-radio resource control (RRC) signaling to RX UE. RX UE should be able to report the SL-RSRP to TX UE via PC5-RRC signaling. TX UE does not notify the gNB of the SL-RSRP measurement result. The SL measurement report can be either event driven or periodic, or both. For the event triggered report, at least the Event A1 (SL-RSRP exceeds a threshold) or the Event A2 (SL-RSRP is lower than a threshold) shall be supported.

Figure 1:
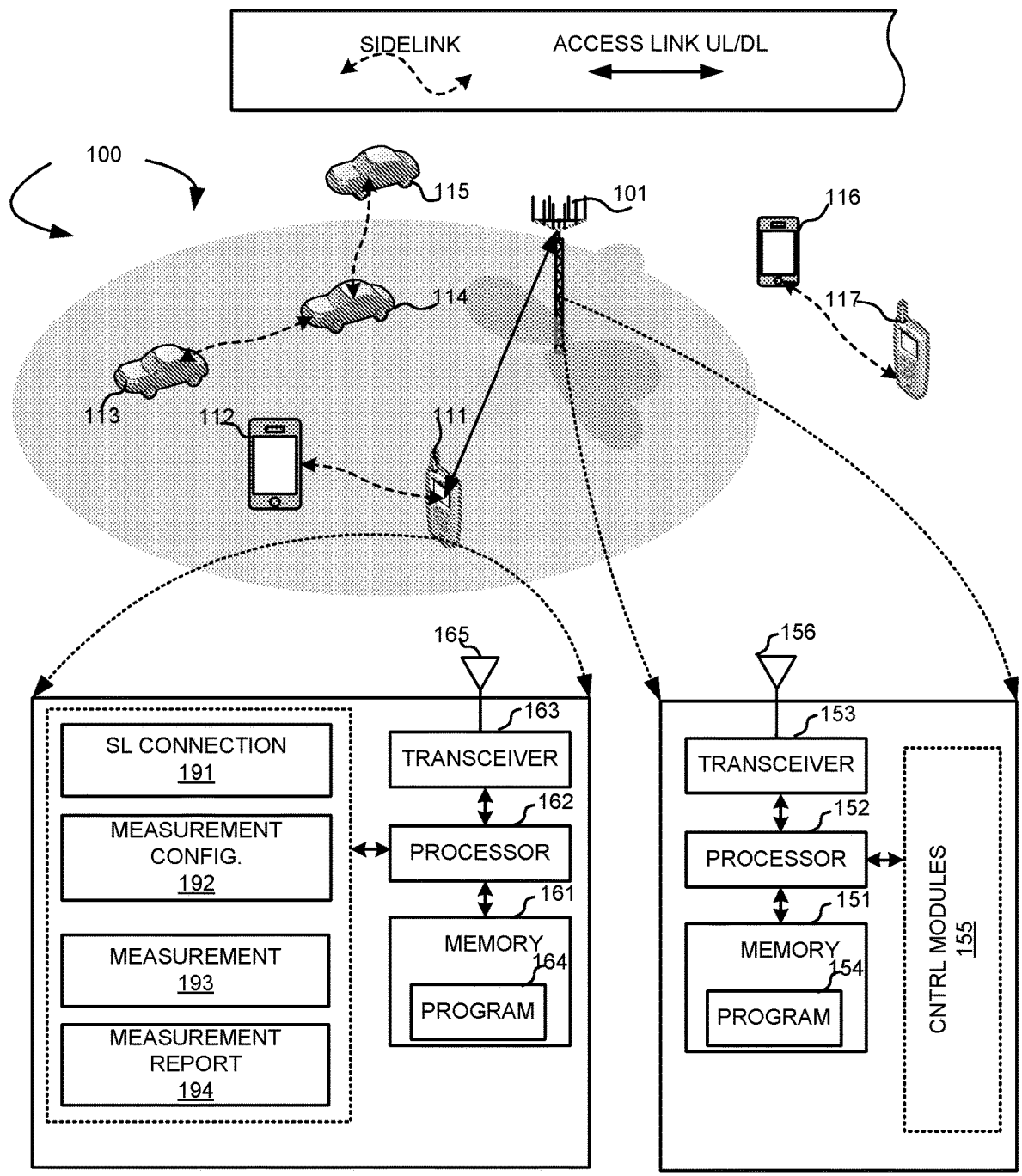
FIG. 1 is a schematic system diagram illustrating an exemplary wireless network for measurement configuration and report for sidelink open-loop power control in accordance with embodiments of the current invention.

FIG. 1 is a schematic system diagram illustrating an exemplary wireless network for measurement configuration and report for sidelink open-loop power control in accordance with embodiments of the current invention. Wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be a homogeneous network or heterogeneous network, which can be deployed with the same frequency or different frequency. gNB 101 is an exemplary base station in the NR network.

Wireless network 100 also includes multiple communication devices or mobile stations, such as user equipments (UEs) 111, 112, 113, 114, 115, 116, and 117. The exemplary mobile devices in wireless network 100 have sidelink capabilities. The mobile devices can establish one or more connections with one or more base stations, such as gNB 101. UE 111 has an access link, with uplink (UL) and downlink (DL), with gNB 101. UE 112, which is also served by gNB 101, may also establish UL and DL with gNB 101. UE 111 also establishes a sidelink with UE 112. Both UE 111 and UE 112 are in-coverage devices. Mobile devices on vehicles, such as mobile devices 113, 114, and 115, also have sidelink capabilities. Mobile device 113 and mobile device 114 are covered by gNB 101. Mobile device 113, an in-coverage device, establishes sidelink with mobile device 114, which is also an in-coverage device. Mobile device 115 on a vehicle, however, is an out-of-coverage device. In-coverage mobile device 114 establishes a sidelink with the out-of-coverage device 115. In other embodiments, the mobile devices, such as UE 116 and 117, may both be out-of-coverage but can transmit and receive data packets with another one or more other mobile stations with sidelink connections.

FIG. 1 further illustrates simplified block diagrams of a base station and a mobile device/UE for open-loop power control. gNB 101 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 101. Memory 151 stores program instructions and data 154 to control the operations of gNB 101. gNB 101 also includes a set of control modules 155 that carry out functional tasks to communicate with mobile stations.

UE 111 has an antenna 165, which transmits and receives radio signals. An RF transceiver circuit 163, coupled with the antenna, receives RF signals from antenna 165, converts them to baseband signals, and sends them to processor 162. In one embodiment, the RF transceiver may comprise two RF modules (not shown). A first RF module is used for HF transmitting and receiving, and the other RF module is used for different frequency bands transmitting and receiving, which is different from the HF transceiver. RF transceiver 163 also converts received baseband signals from processor 162, converts them to RF signals, and sends out to antenna 165. Processor 162 processes the received baseband signals and invokes different functional modules to perform features in THE UE. Memory 161 stores program instructions and data 164 to control the operations of THE UE. Antenna 165 sends uplink transmission and receives downlink transmissions to/from antenna 156 of gNB 101.

The UE also includes a set of control modules that carry out functional tasks. These control modules can be implemented by circuits, software, firmware, or a combination of them. A sidelink connection circuit 191 establishes an SL connection with a transmitting UE in the wireless network. A measurement configuration circuit 192 that receives an SL measurement report configuration for an SL measurement report, wherein the SL measurement report configuration comprising a reference threshold. A measurement circuit 193 performs an L3 filtered SL measurements on the SL to get an SL measurement result including an L3 filtered SL reference signal received power (RSRP). A measurement report circuit 194 sends the SL measurement report based on the SL measurement result to the transmitting UE when a reporting condition is met based on the SL measurement report configuration.

Figure 2:
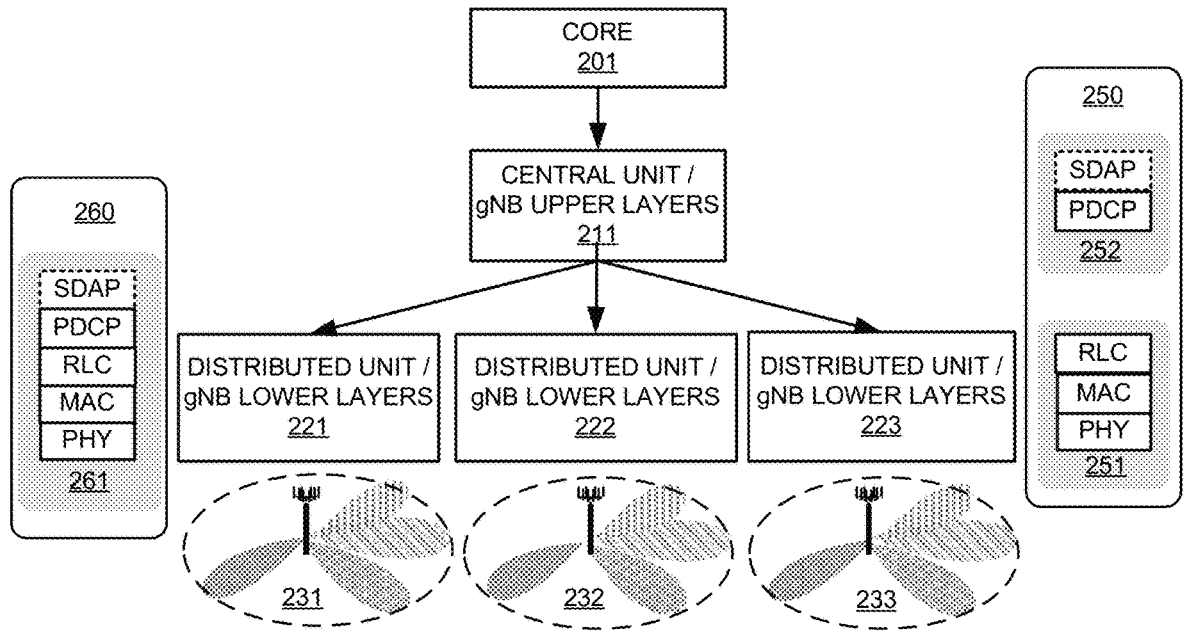
FIG. 2 illustrates an exemplary NR wireless system with centralized upper layers of the NR radio interface stacks in accordance with embodiments of the current invention.

FIG. 2 illustrates an exemplary NR wireless system with centralized upper layers of the NR radio interface stacks in accordance with embodiments of the current invention. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization and jitter. In one embodiment, SDAP and PDCP layer are located in the CU, while RLC, MAC and PHY layers are located in the DU. A Core unit 201 is connected with one central unit 211 with gNB upper layer 252. In one embodiment 250, gNB upper layer 252 includes the PDCP layer and optionally the SDAP layer. Central unit 211 is connected with distributed units 221, 222, and 221. Distributed units 221, 222, and 223 each correspond to a cell 231, 232, and 233, respectively. The DUs, such as 221, 222 and 223 include gNB lower layers 251. In one embodiment, gNB lower layers 251 include the PHY, MAC and the RLC layers. In another embodiment 260, each gNB has the protocol stacks 261, including SDAP, PDCP, RLC, MAC and PHY layers.

In one novel aspect, the sidelink measurement is configured to send the sidelink measurement report to the transmitting UE for open-loop power control. In one embodiment, the first SL measurement configuration includes an absolute threshold. The receiving UE measures the SL RSRP and sends the first measurement report based on the first SL measurement configuration. In another embodiment, the non-first measurement configuration indicates the previous SL measurement as the reference threshold. The receiving UE measures the SL RSRP and sends the first measurement report based on the non-first SL measurement configuration. In yet another embodiment, the SL measurement report is sent upon request from the transmitting UE.

Figure 3:
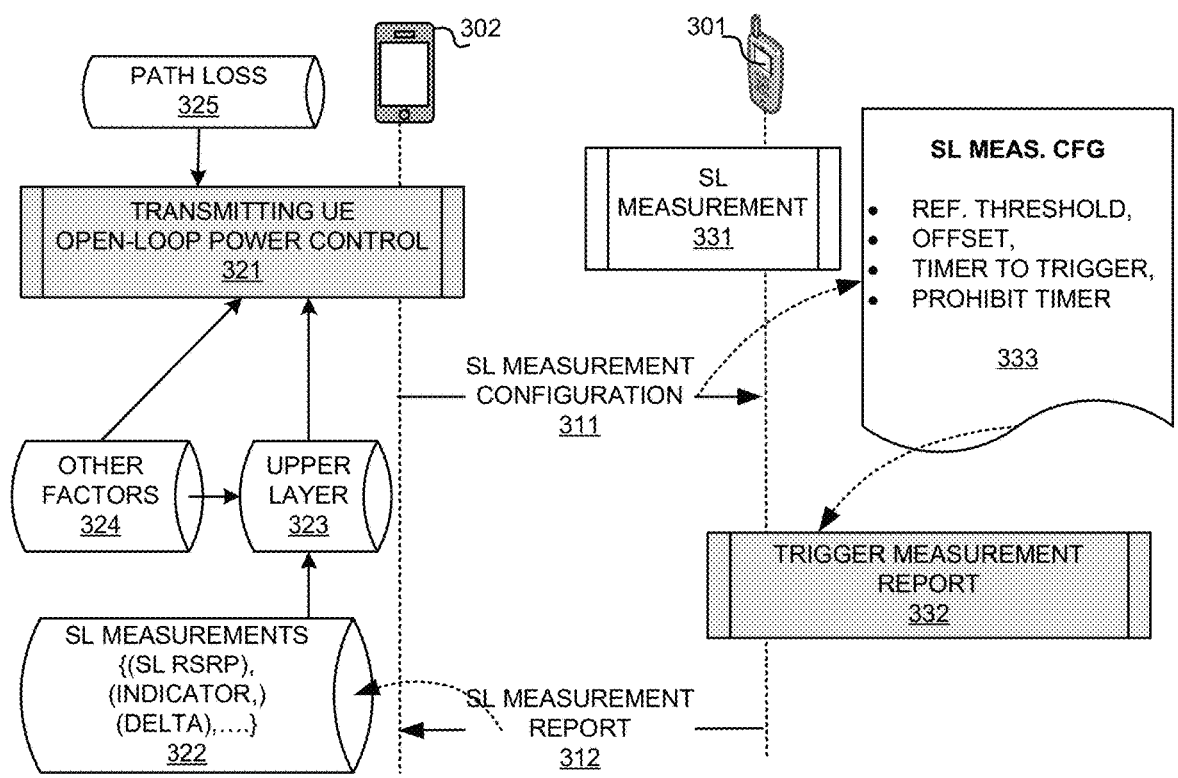
FIG. 3 illustrates exemplary diagrams for the SL measurement configuration and the SL measurement report sending to the transmitting UE for open-loop power control in accordance with embodiments of the current invention.

FIG. 3 illustrates exemplary diagrams for the SL measurement configuration and the SL measurement report sending for open-loop power control in accordance with embodiments of the current invention. UE 301 and UE 302 establish sidelink connection. Transmitting UE 302, at step 321, performs open-loop power control. The open-loop power control includes transmitting UE 302 measures pathloss at step 325, receives other factors at step 324, and/or at step 323, receives other factors through upper layer signaling. In one novel aspect, SL measurement report received from the receiving UE 301 provides L3 filtered SL RSRP measurement is also used for open-loop power control at the UE 302. UE 301, at step 331, performs SL measurement. At step 311, transmitting UE 302 sends SL measurement configuration to receiving UE 301. In one embodiment, the SL measurement configuration is sent through PC5 RRC message. SL measurement configuration 333 includes one or more of: a reference threshold, one or more offsets, a timer to trigger, and a prohibit timer. At step 332, receiving UE 301 detects one or more triggering events based on the SL measurement configuration 333. At step 312, receiving UE 302 sends the SL measurement report. In one embodiment, the SL measurement report 322, including at least one of the elements including, a Boolean indicator, delta value between actual measurement value and the reference threshold, actual measurement value.

In one embodiment, there is a time duration (e.g. the timer to trigger) configured within the measurement configuration 333 for a particular measurement event over PC5-RRC for the purpose of SL measurement report in order to enable open loop power control over PC5 for TX UE. When this timer is configured, the SL measurement value needs meet the report conditions consistently for the duration of the timer to trigger before sending the SL measurement report. In another embodiment, there is an SL measurement report prohibit timer configured within the measurement configuration for a particular measurement event over PC5-RRC for the purpose of SL measurement report in order to enable open loop power control over PC5 for TX UE. This prohibit timer is used to avoid too frequent SL measurement reports over the PC5 and/or to avoid the overhead of the PC5-RRC signaling. When this prohibit timer is configured and the timer is not running, the UE judges if the report triggering is met with the other configurations. For example, the UE compares the current L3 filtered SL signal strength (e.g., SL RSRP) with configured absolute reference threshold, with configured absolute reference threshold and an offset, with the latest SL measurement report, or with the latest SL measurement report and a configured offset. In other embodiments, the SL measurement configuration 333, or one or more parameters in the above-referenced configuration is preconfigured, configured through system information block (SIB), or carried within the measurement configuration over PC5-RRC.

Figure 4:
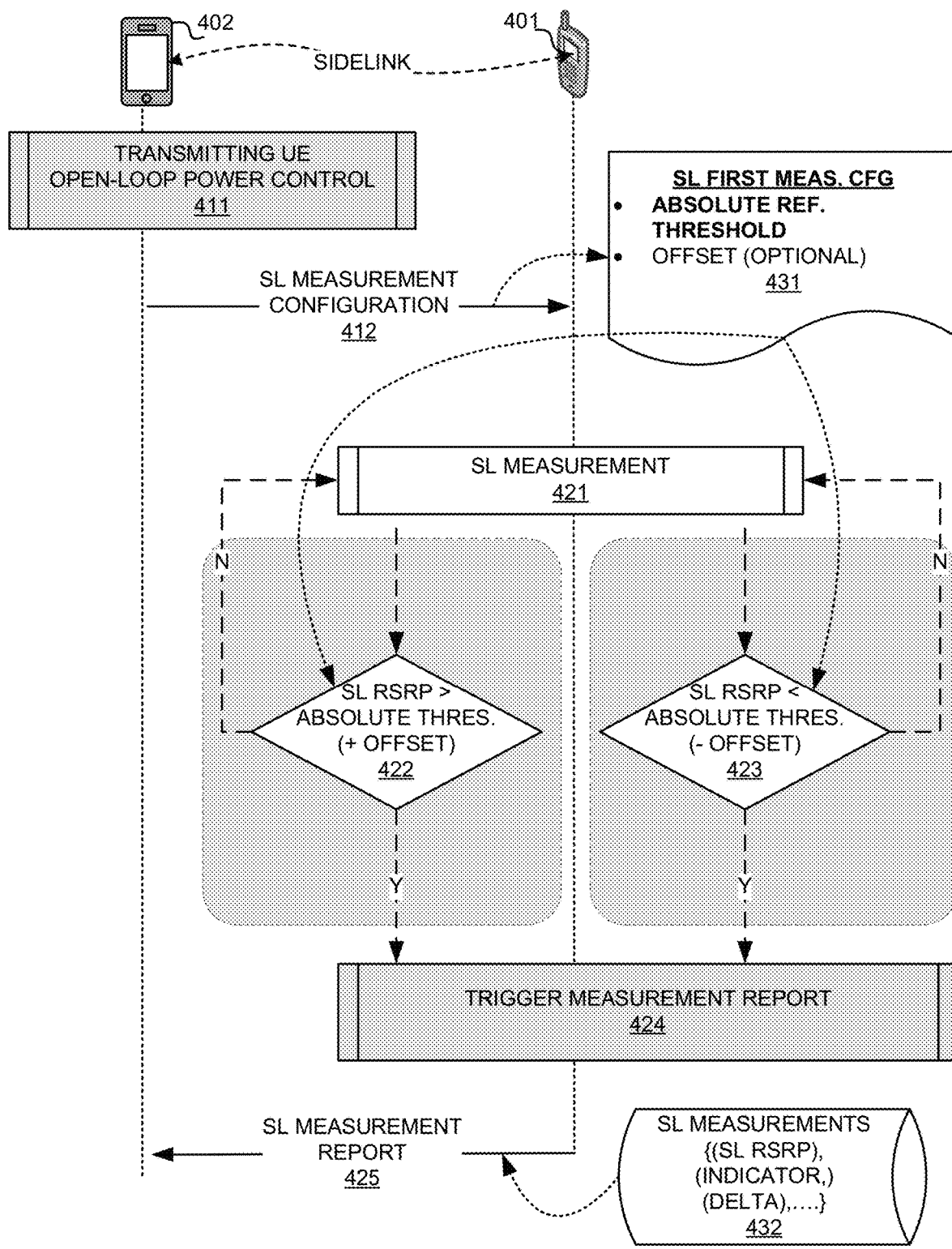
FIG. 4 illustrates exemplary diagrams for a first sidelink measurement configuration and report for sidelink open-loop power control in accordance with embodiments of the current invention.

FIG. 4 illustrates exemplary diagrams for a first sidelink measurement configuration and report for sidelink open-loop power control in accordance with embodiments of the current invention. UE 401 and UE 402 are connected with a sidelink. At step 411, transmitting UE 402 performs open-loop power control. At step 412, UE 402 sends a sidelink measurement configuration to UE 401. In one embodiment, UE 401 obtains SL first measurement configuration 431, which includes an absolute reference threshold. Optionally, SL first measurement configuration 431 includes one or more offsets. In one embodiment, the first SL measurement configuration is part of a SL measurement configuration sent through PC5-RRC or through SIB from UE 402. In another embodiment, the SL measurement configuration received through PC-5 RRC or SIB contains only the first SL measurement configuration. In yet other embodiments, one or more of the configuration parameters are preconfigured or predefined. In one embodiment, the SL first measurement configuration 431 also includes the triggering conditions for the sending of the SL measurement report. In other embodiments, UE 401 detects triggering conditions based on the one or more parameters in SL first measurement configuration 431, such as the absolute reference threshold. At step 421, UE 401 performs SL measurements. UE 401 detects one or more triggering conditions. In one embodiment, at step 422, UE 401 determines whether the L3 filtered measurement value, such as the filtered SL RSRP, is higher/better than the absolute reference threshold. If yes, at step 424, the sending of the measurement report is triggered. Otherwise, UE 401 continues monitoring the SL measurements. In another embodiment, UE 401 determines, at step 423, whether the L3 filtered measurement value, such as the filtered SL RSRP, is lower than the absolute reference threshold. If yes, at step 424, the sending of the measurement report is triggered. Otherwise, UE 401 continues monitoring the SL measurements. Step 422 and step 423 can be combined to check if any conditions are met to trigger the sending of the measurement report. In other embodiments, an offset is also configured for the first measurement configuration. UE 401 checks if at least one triggering condition is met based on the configured offset. In one embodiment, the condition at step 422 is to determine whether the L3 filtered measurement value, such as the filtered SL RSRP, is the offset better/higher than the absolute reference threshold. The condition at step 423 is to determine whether the L3 filtered measurement value, such as the filtered SL RSRP, is the offset lower than the absolute reference threshold. In yet another embodiment, two different valued offsets, the first offset and the second offset are configured for the first measurement configuration. The condition at step 422 is to determine whether the L3 filtered measurement value, such as the filtered SL RSRP, is the first offset better/higher than the absolute reference threshold. The condition at step 423 is to determine whether the L3 filtered measurement value, such as the filtered SL RSRP, is the second offset lower than the absolute reference threshold. At step 425, UE 401 sends the first measurement report to UE 402. In one embodiment, the first SL measurement report 432 includes a Boolean indicator to show that the SL measurement value is higher than or lower than the absolute reference threshold. In another embodiment, the first SL measurement report 432 includes a Boolean indicator to show that the SL measurement value is offset higher than or offset lower than the configured absolute reference threshold. In yet another embodiment, the first SL measurement report 432 includes the delta value between the actual L3 filtered measurement value (e.g. L3 filtered SL RSRP) and the configured absolute reference threshold. In another embodiment, the report content of the first SL measurement report 432 includes the actual L3 filtered measurement value (e.g. L3 filtered SL RSRP).

Figure 5:
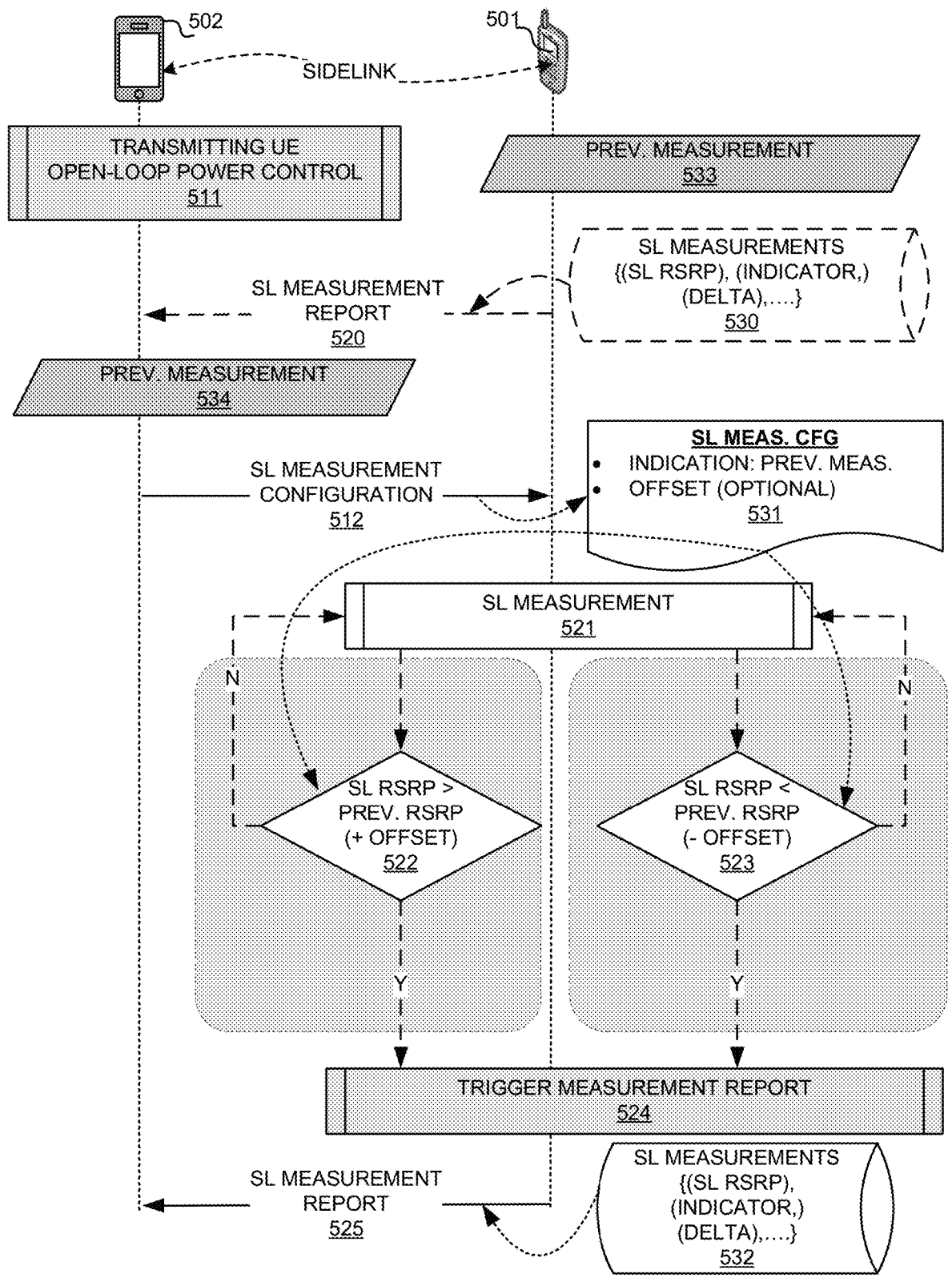
FIG. 5 illustrates exemplary diagrams for a non-first sidelink measurement configuration and report for sidelink open-loop power control in accordance with embodiments of the current invention.

FIG. 5 illustrates exemplary diagrams for a non-first sidelink measurement configuration and report for sidelink open-loop power control in accordance with embodiments of the current invention. UE 501 and UE 502 are connected with a sidelink. One or more previous SL measurements 533 are stored at UE 501 and corresponding previous SL measurements 534 are stored at UE 502. The previous SL measurements can be the absolute SL measurement values, such RSRP, measurement indicators, delta values with reference to a reference threshold or other forms. Optionally, at step 520, the SL measurement report message including the SL measurement report 530 is sent to UE 502. At step 511, transmitting UE 502 performs open-loop power control. At step 512, UE 502 sends a sidelink measurement configuration to UE 501. In one embodiment, UE 501 obtains SL measurement configuration 531, which includes reference threshold. In one embodiment, the reference threshold is indicated by an indication and the reference threshold is set to be the previous reported measurement result. Optionally, SL measurement configuration 531 includes one or more offsets. In one embodiment, the SL measurement configuration is part of a SL measurement configuration sent through PC5-RRC or through SIB from UE 502. In another embodiment, the SL measurement configuration received through PC-5 RRC or SIB contains only the SL measurement configuration. In yet other embodiments, one or more of the configuration parameters are preconfigured or predefined. In one embodiment, the SL measurement configuration 531 also includes the triggering conditions for the sending of the SL measurement report. In other embodiments, UE 501 detects triggering conditions based on the one or more parameters in SL measurement configuration 531, such as the reference threshold. At step 521, UE 501 performs SL measurements. UE 501 detects one or more triggering condition. In one embodiment, at step 522, UE 501 determines whether the L3 filtered measurement value, such as the filtered SL RSRP, is higher/better than the reference threshold, which is the previous measurement results. If yes, at step 524, the sending of the measurement report is triggered. Otherwise, UE 501 continues monitoring the SL measurements. In another embodiment, UE 501 determines, at step 523, whether the L3 filtered measurement value, such as the filtered SL RSRP, is lower than the reference threshold, which is the previous measurement results. If yes, at step 524, the sending of the measurement report is triggered. Otherwise, UE 501 continues monitoring the SL measurements. Step 522 and step 523 can be combined to check if any conditions are met to trigger the sending of the measurement report. In other embodiments, an offset is also configured for the SL measurement configuration. UE 501 checks if at least one triggering condition is met based on the configured offset. In one embodiment, the condition at step 522 is to determine whether the L3 filtered measurement value, such as the filtered SL RSRP, is the offset better/higher than the reference threshold, which is the previous measurement results. The condition at step 523 is to determine whether the L3 filtered measurement value, such as the filtered SL RSRP, is the offset lower than the reference threshold, which is the previous measurement results. In yet another embodiment, two different valued offsets, the first offset and the second offset are configured for the SL measurement configuration. The condition at step 522 is to determine whether the L3 filtered measurement value, such as the filtered SL RSRP, is the first offset better/higher than the reference threshold, which is the previous measurement results. The condition at step 523 is to determine whether the L3 filtered measurement value, such as the filtered SL RSRP, is the second offset lower than the reference threshold, which is the previous measurement results. At step 525, UE 501 sends the measurement report 532 to UE 502. In one embodiment, the SL measurement report 532 includes a Boolean indicator to show that the SL measurement value is higher than or lower than the reference threshold, which is the previous measurement results. In another embodiment, the SL measurement report 532 includes a Boolean indicator to show that the SL measurement value is offset higher than or offset lower than the configured reference threshold, which is the previous measurement results. In yet another embodiment, the SL measurement report 532 includes the delta value between the actual L3 filtered measurement value (e.g. L3 filtered SL RSRP) and the configured reference threshold, which is the previous measurement results. In another embodiment, the report content of the SL measurement report 532 includes the actual L3 filtered measurement value (e.g. L3 filtered SL RSRP).

Figure 6:
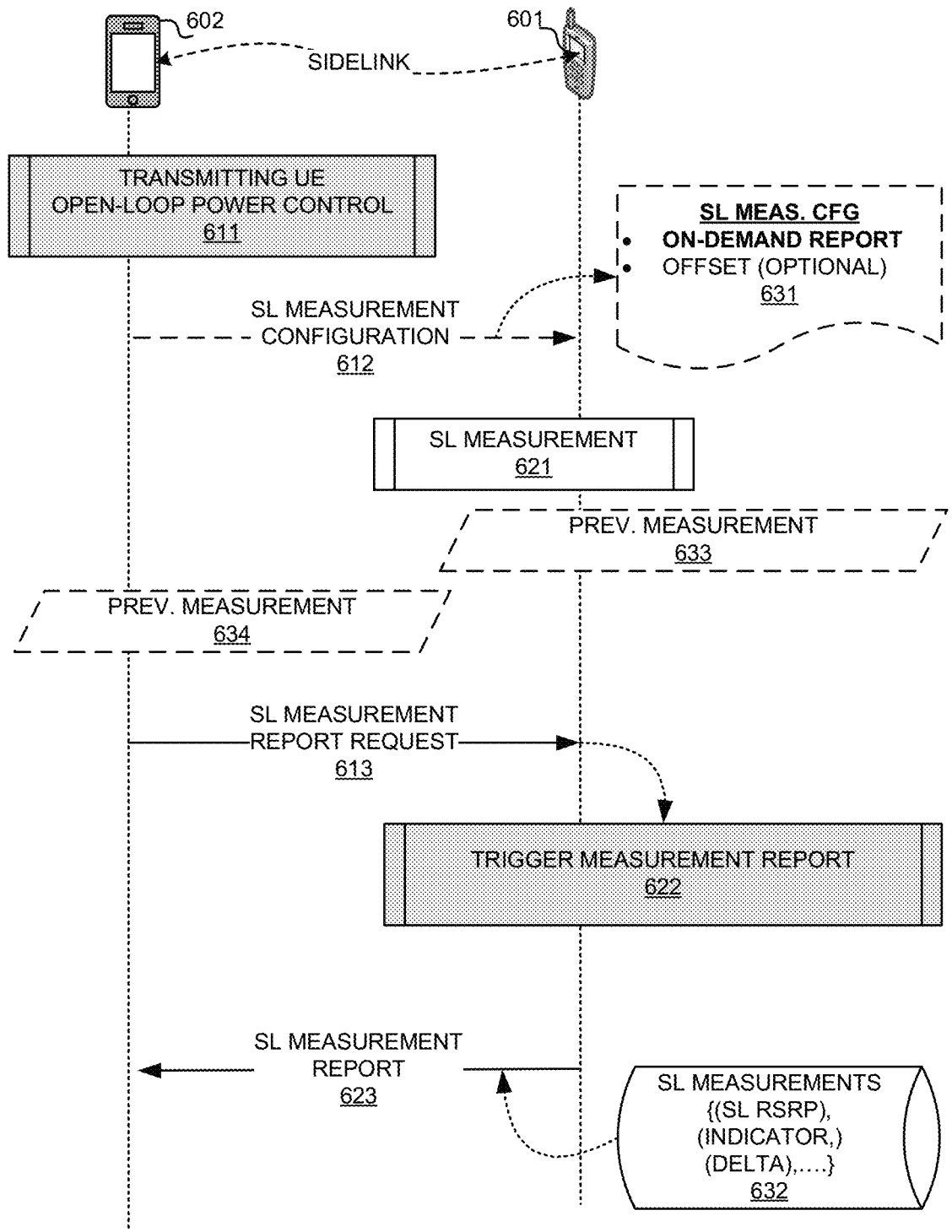
FIG. 6 illustrates exemplary diagrams for an explicitly requested sidelink measurement report by the transmitting UE for sidelink open-loop power control in accordance with embodiments of the current invention.

FIG. 6 illustrates exemplary diagrams for an explicitly requested sidelink measurement report by the transmitting UE for sidelink open-loop power control in accordance with embodiments of the current invention. UE 601 and UE 602 are connected with a sidelink. One or more previous SL measurements 633 are stored at UE 601 and corresponding previous SL measurements 634 are stored at UE 602. At step 611, transmitting UE 602 performs open-loop power control. At step 612, UE 602 sends a sidelink measurement configuration to UE 601. In one embodiment, UE 601 obtains SL measurement configuration 631. SL measurement configuration 631 includes an indication of the on-demand report request. Optionally, SL measurement configuration 631 includes one or more offsets. In one embodiment, the on-demand request for measurement report is preconfigured. In one embodiment, the on-demand report request comprises a reference threshold. In one embodiment, the SL measurement configuration 631 also includes the triggering conditions for the sending of the SL measurement report. In other embodiments, UE 601 detects triggering conditions based on the one or more parameters in SL measurement configuration 631, such as the indication of the on-demand report request. At step 613, UE 602 sends SL measurement report request message to UE 601. In one embodiment, the message is sent through PC5-RRC. At step 622, the receiving of the explicit measurement report request triggers the sending of the SL measurement report. At step 623, UE 601 sends the measurement report 632 to UE 602. In one embodiment, the on-demand sending of SL measurement report is combined with the first measurement report and/or the non-first measurement report procedures in FIG. 4 and FIG. 5. In one embodiment, the SL measurement report 632 includes a Boolean indicator to show that the SL measurement value is higher than or lower than a reference threshold. In another embodiment, the SL measurement report 632 includes a Boolean indicator to show that the SL measurement value is offset higher than or offset lower than the configured reference threshold. In yet another embodiment, the SL measurement report 632 includes the delta value between the actual L3 filtered measurement value (e.g. L3 filtered SL RSRP) and the configured reference threshold. In another embodiment, the report content of the SL measurement report 632 includes the actual L3 filtered measurement value (e.g. L3 filtered SL RSRP).

Figure 7:
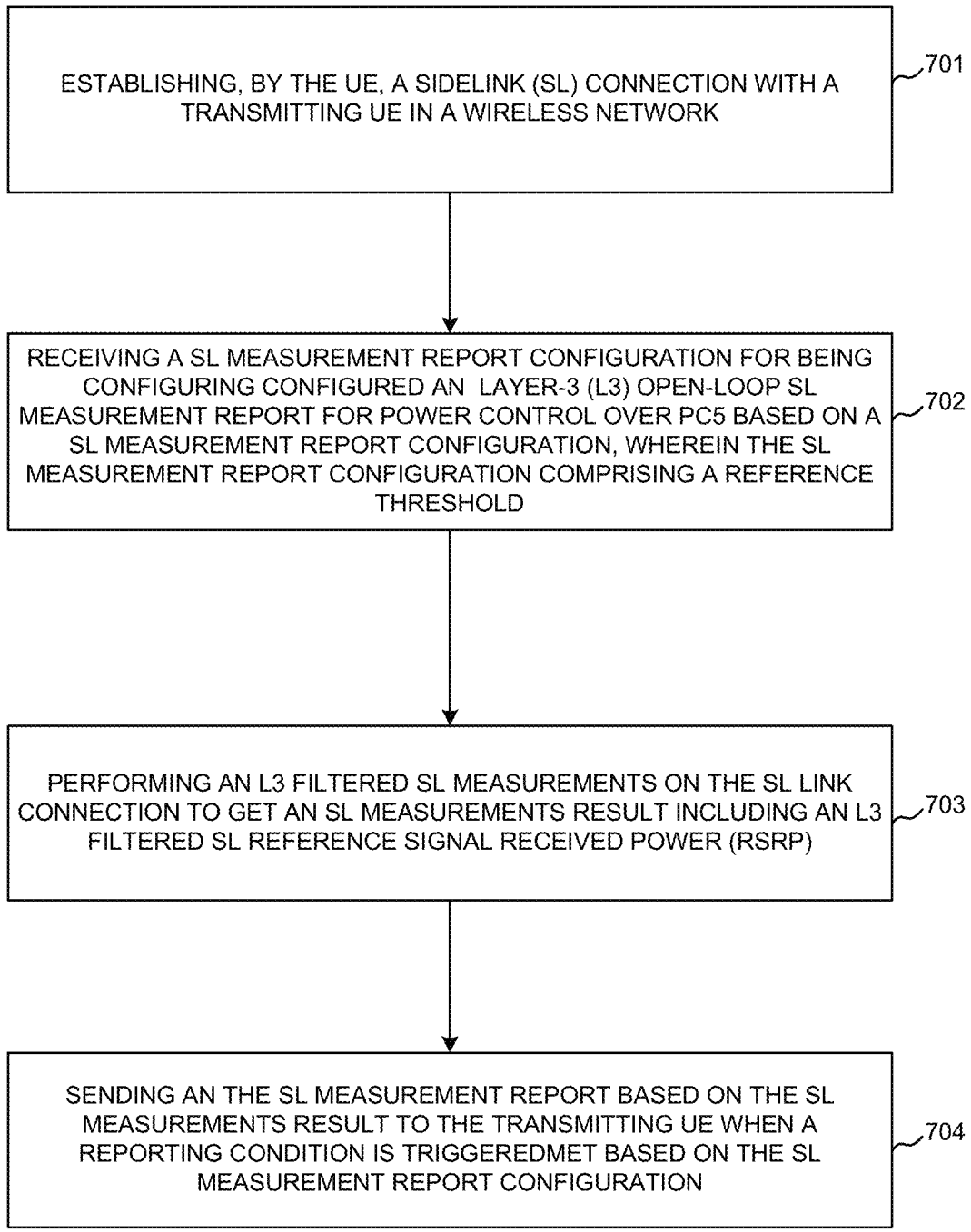
FIG. 7 illustrates an exemplary flow chart for sidelink measurement configuration and report for open-loop power control in accordance with embodiments of the current invention.

FIG. 7 illustrates an exemplary flow chart for sidelink measurement configuration and report for open-loop power control in accordance with embodiments of the current invention. At step 701, the UE establishes a sidelink (SL) connection with a transmitting UE in a wireless network. At step 702, the UE receives SL measurement report configuration for a Layer-3 (L3) SL measurement report for open-loop power control, wherein the SL measurement report configuration comprising a reference threshold. At step 703, the UE performs an L3 filtered SL measurement on the SL link connection to get an SL measurement result, including an L3 filtered SL reference signal received power (RSRP). At step 704, the UE sends an SL measurement report based on the SL measurement result to the transmitting UE when a reporting condition is met based on the SL measurement report configuration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a user equipment (UE), comprising:
   establishing, by the UE, a sidelink (SL) connection with a transmitting UE in a wireless network;
   receiving an SL measurement report configuration for an SL measurement report, wherein the SL measurement report configuration comprising a reference threshold;
   performing a layer-3 (L31 filtered SL measurements on the SL link connection to get an SL measurement result including an L3 filtered SL reference signal received power (RSRP); and
   sending the SL measurement report based on the SL measurement result to the transmitting UE when a reporting condition is met based on the SL measurement report configuration.

2. The method of claim 1, wherein the SL measurement report configuration configures a first measurement report, and wherein the reference threshold is an absolute reference threshold.

3. The method of claim 1, wherein the reference threshold is an SL measurement result in an SL measurement report previously sent to the transmitting UE.

4. The method of claim 1, wherein the reporting condition is the L3 filtered SL RSRP measurement being higher than the reference threshold.

5. The method of claim 1, wherein the reporting condition is the L3 filtered SL RSRP measurement being lower than the reference threshold.

6. The method of claim 1, wherein the SL measurement report configuration further comprising an offset.

7. The method of claim 6, wherein the reporting condition is the L3 filtered SL RSRP measurement is the offset higher than the reference threshold.

8. The method of claim 6, wherein the reporting condition is the L3 filtered SL RSRP measurement is the offset lower than the reference threshold.

9. The method of claim 1, wherein the reporting condition is an explicit request of measurement report from the transmitting UE.

10. The method of claim 1, wherein the SL measurement report includes one or more elements comprising a Boolean indicator, a delta value between the L3 filtered SL RSRP measurement and the reference threshold, and an absolute value of the L3 filtered SL RSRP measurement.

11. A user equipment (UE), comprising:
    a transceiver that transmits and receives radio frequency (RF) signal in a new radio (NR) wireless network;
    a sidelink (SL) connection circuit that establishes an SL connection with a transmitting UE in the wireless network;
    a measurement configuration circuit that receives an SL measurement report configuration for an SL measurement report, wherein the SL measurement report configuration comprising a reference threshold;
    a measurement circuit that performs a layer-3 (L31 filtered SL measurement on the SL connection to get SL measurements including an L3 filtered SL reference signal received power (RSRP); and
    a measurement report circuit that sends the SL measurement report based on the SL measurement result to the transmitting UE when a reporting condition is met based on the SL measurement report configuration.

12. The UE of claim 11, wherein the SL measurement report configuration configures a first measurement report, and wherein the reference threshold is an absolute reference threshold.

13. The UE of claim 11, wherein the reference threshold is an SL measurement result in an SL measurement report previously sent to the transmitting UE.

14. The UE of claim 11, wherein the reporting condition is the L3 filtered SL RSRP measurement being higher than the reference threshold.

15. The UE of claim 11, wherein the reporting condition is the L3 filtered SL RSRP measurement being lower than the reference threshold.

16. The UE of claim 11, wherein the SL measurement report configuration further comprising an offset.

17. The UE of claim 16, wherein the reporting condition is the L3 filtered SL RSRP measurement is the offset higher than the reference threshold.

18. The UE of claim 16, wherein the reporting condition is the L3 filtered SL RSRP measurement is the offset lower than the reference threshold.

19. The UE of claim 11, wherein the reporting condition is an explicit request of measurement report from the transmitting UE.

20. The UE of claim 11, wherein the SL measurement report includes one or more elements comprising a Boolean indicator, a delta value between the L3 filtered SL RSRP measurement and the reference threshold, and an absolute value of the L3 filtered SL RSRP measurement.

* * * * *

UNITED STATES PATENT AND TRADEMARK OFFICE
CERTIFICATE OF CORRECTION

Page 1 of 1

PATENT NO. : 11,510,089 B2
APPLICATION NO. : 17/125351
DATED : November 22, 2022
INVENTOR(S) : Xuelong Wang et al.

It is certified that error appears in the above-identified patent and that said Letters Patent is hereby corrected as shown below:

In the Claims

Column 9, Line 31, the word "(L31" needs to change to "(L3)"

Column 10, Line 20, the word "(L31" needs to change to "(L3)"

Signed and Sealed this
Fifteenth Day of August, 2023

Katherine Kelly Vidal
*Director of the United States Patent and Trademark Office*